United States Patent [19]

Coleman

[11] Patent Number: 4,996,760

[45] Date of Patent: Mar. 5, 1991

[54] METHOD OF INSTALLING A FLEXIBLE LINER WITHIN THE SHELL OF A BULK MATERIAL CONTAINER

[75] Inventor: Clarence B. Coleman, Oakland, Calif.

[73] Assignee: Fabricated Metals, Inc., San Leandro, Calif.

[21] Appl. No.: 476,691

[22] Filed: Feb. 8, 1990

Related U.S. Application Data

[62] Division of Ser. No. 251,326, Sep. 30, 1988, Pat. No. 4,960,227.

[51] Int. Cl.[5] .......... B23P 19/04

[52] U.S. Cl. .......... 29/454; 29/525.1; 222/105; 220/403

[58] Field of Search .......... 29/454, 464, 525.1, 29/271; 222/105, 130, 181, 185; 220/403, 410, 462; 141/114, 390; 294/97; 81/488

[56] References Cited

U.S. PATENT DOCUMENTS

| | | | |
|---|---|---|---|
| 2,074,959 | 3/1957 | Guest | 73/82 |
| 2,924,434 | 2/1960 | Potter et al. | 255/28 |
| 3,235,138 | 2/1966 | Bull | 222/263 |
| 3,372,725 | 3/1968 | Voorhees | 150/49 |
| 3,531,142 | 9/1970 | Peasley | 285/39 |
| 3,590,888 | 7/1971 | Coleman | 141/5 |
| 4,008,621 | 2/1977 | Ostojic et al. | 73/421.5 R |
| 4,165,024 | 8/1979 | Oswalt et al. | 222/105 |
| 4,167,235 | 9/1979 | Green | 222/105 |
| 4,256,150 | 3/1981 | Mockesch | 141/5 |
| 4,375,864 | 3/1983 | Savage | 222/81 |
| 4,428,507 | 1/1984 | Sneider | 222/105 |
| 4,537,329 | 8/1985 | Norton | 220/465 |
| 4,586,628 | 5/1986 | Nittel | 220/470 |
| 4,658,989 | 4/1987 | Bonerb | 222/105 |
| 4,706,850 | 11/1987 | Remaks | 222/105 |
| 4,785,974 | 11/1988 | Rudick et al. | 222/105 |

FOREIGN PATENT DOCUMENTS

| | | | |
|---|---|---|---|
| 0117619 | 11/1986 | European Pat. Off. . | |
| 1324104 | 3/1963 | France . | |
| 365965 | 1/1963 | Switzerland . | |
| 406758 | 8/1966 | Switzerland | 285/158 |
| 1135772 | 12/1968 | United Kingdom . | |
| 2135287 | 8/1984 | United Kingdom . | |

OTHER PUBLICATIONS

An engineering drawing of the Sieger Liner Installation of Vienna, Austria.

*Primary Examiner*—P. W. Echols
*Assistant Examiner*—David P. Bryant
*Attorney, Agent, or Firm*—Jack M. Wiseman

[57] ABSTRACT

A bulk material container comprising a flexible liner with a bottom outlet fitting. The bottom outlet fitting of the flexible liner is inserted by means of an installing tool into a bottom opening of the shell of the container. The bottom outlet fitting has a substantially square internal pocket shape that is adapted for receiving fingers of the insertion tool for installation in the shell.

3 Claims, 5 Drawing Sheets

FIG. 1
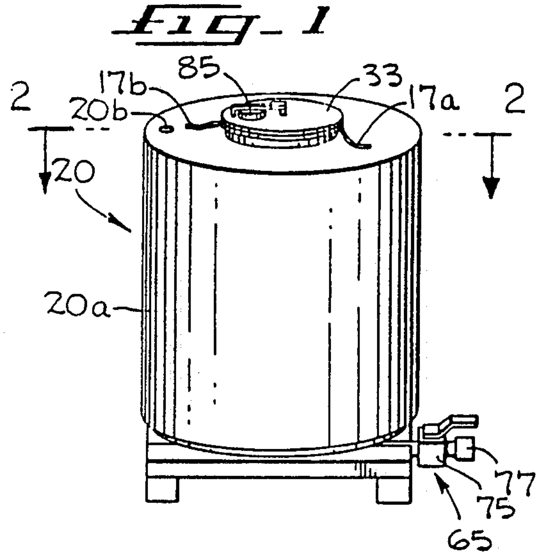
FIG. 2
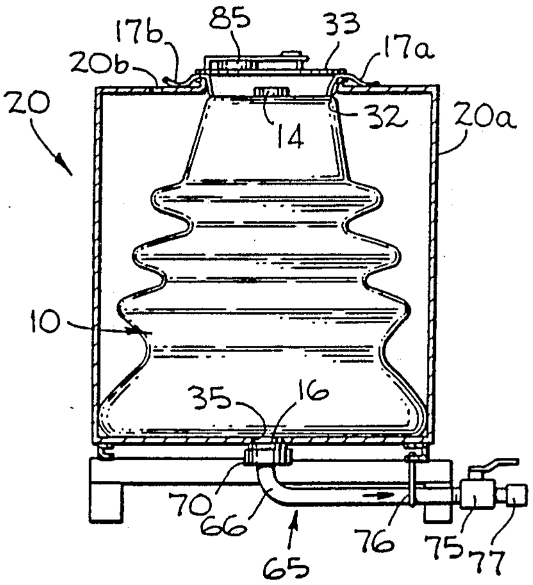
FIG. 3
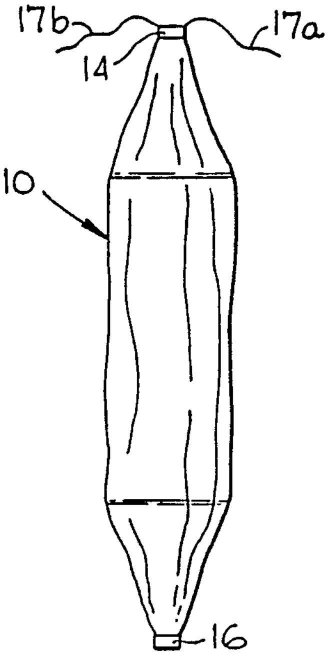
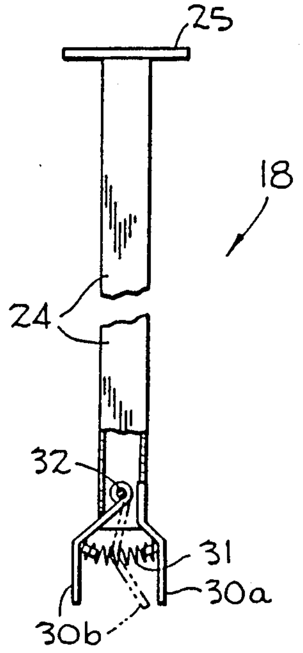
FIG. 4

Fig_10
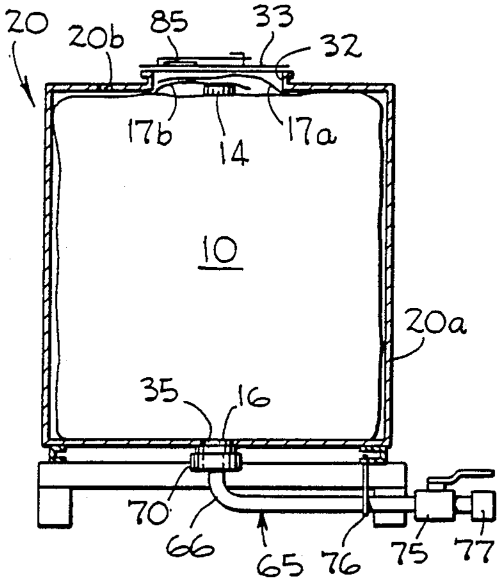
Fig_11
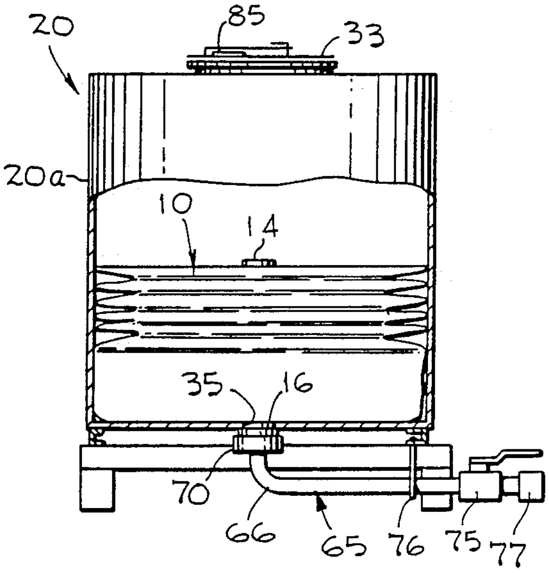
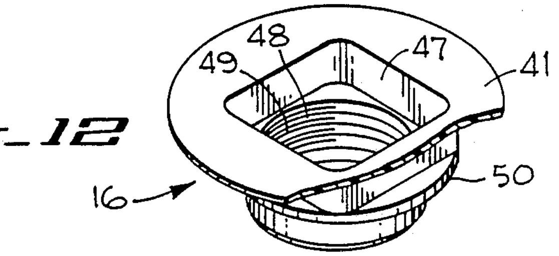
Fig_12
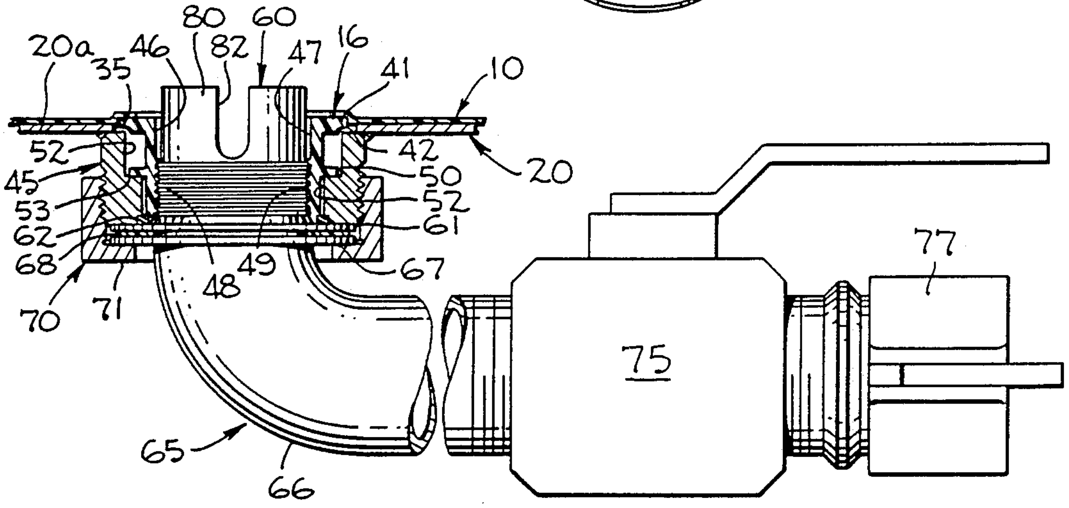
Fig_8

METHOD OF INSTALLING A FLEXIBLE LINER WITHIN THE SHELL OF A BULK MATERIAL CONTAINER

RELATED APPLICATION

This application is a divisional application of my copending application, application Ser. No. 07/251,326, filed on Sept. 30, 1988, now U.S. Pat. No. 4,960,227 for Bulk Material Container With A Flexible Liner

BACKGROUND OF THE INVENTION

The present invention relates in general to bulk material containers, and more particularly to a bulk material container with a flexible liner.

Heretofore, the shell of a bulk material container had a flexible liner installed therein. At the bottom of the flexible liner was an opening, which received a tubular outlet fitting. The tubular outlet fitting of the flexible liner was inserted through a suitable opening at the bottom of the shell of the bulk material container. An outlet conduit was connected to the tubular outlet fitting externally of the shell. By using a combination of expansion of the tubular outlet fitting and compression of the discharge edge of the tubular outlet fitting, a seal was provided between the flexible liner and the outlet conduit. This was a single seal relying on both diameter and length clearances to maintain a fixed dimension and thus a seal. Material, such as polyethylene, is known to flow under pressure, and conceivably could lose the effect of a single seal. Thus, heretofore there was a lack of certainty that the tubular outlet fitting of the flexible liner was properly positioned to receive the outlet conduit which locked the tubular outlet fitting of the flexible liner into position. Hence, the extent of the seal was uncertain.

In the U.S. patent to Nittel, U.S. Pat. No. 4,586,628, issued on May 6, 1986, for Resilient Inner Liner For Lining of Transport Or Storage Containers, there is disclosed a liner for a container. The liner is installed through a bottom opening of the container. A string or wire is fastened at the upper end of the liner to pull the liner to an upper opening of the container. A feed pipe is bonded to the lower end of the liner. A lower flange on the feed pipe abuts against the wall defining the opening at the lower end of the container.

The U.S. patent to Oswalt et al., U.S. Pat. No. 4,165,024, issued on Aug. 21, 1979, for Bulk Shipping Container, discloses a container with a liner. The liner has an opening at the bottom wall thereof. A draw and flow valve assembly includes a sealing nut that is disposed at the end of a draw conduit. The sealing nut causes a sealing ring to seal the wall surrounding the bottom opening of the liner to the valve assembly for the passage of bulk material. The container is filled with bulk material, or the bulk material can be discharged, through the bottom opening of the liner.

The U.S. patent to Mockesch, U.S. Pat. No. 4,256,150, issued on Mar. 17, 1981, for Method of Filling A Plastic Bag In A Pressure Tank With A Carbonated Beverage, In Particular Beer, discloses a spherical container open at the top thereof and at the bottom thereof. A liner is closed at the top and is opened at the bottom thereof. A ring, which forms the open bottom end of the liner, is seated in the opening at the bottom of the container. Beer is introduced into and removed from the opening at the bottom of the container and is introduced into and removed from the opening at the bottom of the liner. The liner is dropped into the container through the top opening of the container. The bottom opening of the liner is retained at the bottom opening of the container.

SUMMARY OF THE INVENTION

An object of the present invention is to provide an improved method for installing a flexible liner within a container.

Another object of the present invention is to provide a bulk material container with a fluid tight seal between a flange of a bottom outlet fitting of a flexible liner and a wall of a discharge fitting at the bottom of the container.

Another object of the present invention is to provide a bulk material container that has an outlet fitting of a flexible liner below the product level which outlet fitting is connected to an external outlet conduit in a liquid tight relation.

Another object of the present invention is to provide a bulk material container in which the outlet fitting of a flexible liner for the bulk material container is properly positioned to receive a sleeve of an outlet assembly that locks the flexible liner in position.

Another object of the present invention is to provide a bulk material container in which is disposed a flexible liner having a bottom outlet fitting. A threaded sleeve of an outlet assembly is received in threaded engagement by the bottom outlet fitting of the flexible liner. Continued movement of the sleeve within the bottom outlet fitting urges a sealing ring to be compressed between the bottom outlet fitting and a flange on the threaded sleeve to form a seal. A flange on the bottom outlet fitting of the flexible liner is pulled against a shoulder of the discharge fitting to form another seal.

Another object of the present invention is to provide an installing tool for facilitating the installation of a flexible liner in a bulk material container.

Briefly, the present invention comprises a bulk material container with a flexible liner which has an outlet fitting at the bottom thereof. A tool is employed for installing the flexible liner into the container, and installing the outlet fitting of the flexible liner into a discharge fitting of the container for discharging bulk material from the flexible liner into an outlet assembly. The bottom outlet fitting of the flexible liner has an internal cavity with upright walls adapted to receive fingers of the installing tool.

The bottom outlet fitting has a flange that is adapted for forming a fluid tight seal with the discharge fitting at the bottom of the container. The bottom outlet fitting is disposed in threaded engagement with a threaded sleeve. The continued movement of the sleeve within the bottom outlet fitting urges the flange of the bottom outlet fitting into sealing engagement with the discharge fitting.

A sealing ring is disposed between the bottom outlet fitting and the threaded sleeve. Continued movement of the threaded sleeve within the bottom outlet fitting compresses the sealing ring for forming a seal between the bottom outlet fitting and the sleeve.

BRIEF DESCRIPTION OF THE DRAWINGS

FIG. 1 is a perspective view of a bulk material container embodying the present invention.

FIG. 2 is a vertical sectional view taken along line 2—2 of FIG. 1 with a flexible liner embodying the present invention in a partially inflated state shown in elevation and illustrated installed within the container as a fixed liner.

FIG. 3 is a diagrammatic, elevation view of the flexible liner shown in FIG. 2 in a deflated state.

FIG. 4 is a fragmentary, diagrammatic, elevation view of a flexible liner installing tool embodying the present invention shown partially in section.

FIG. 8 is a vertical section view of the bottom outlet fitting taken along line 8—8 of FIG. 7 and illustrated with a discharge fitting shown in section, a fastener shown in section and the sleeve and conduit of an outlet assembly shown in elevation.

FIG. 10 is a vertical sectional view of the bulk material container taken along line 2—2 of FIG. 1 and illustrating the flexible liner in elevation installed within the container, connected to the outlet assembly shown in elevation and inflated prior to being filled with bulk material.

FIG. 11 is a vertical sectional view of the bulk material container partially in elevation taken along line 2—2 of FIG. 1 and illustrated with the flexible liner in elevation and installed within the container as a floating liner in a partially inflated state.

FIG. 12 is a fragmentary, perspective view of the bottom outlet fitting shown in FIG. 7.

DESCRIPTION OF THE PREFERRED EMBODIMENTS

Illustrated in FIGS. 1 and 2 is a bulk material container 20 and a well-known flexible liner 10 made of suitable flexible material for containing bulk material. The liner 10, in the exemplary embodiment, is made of polyvinyl chloride or polyethylene (FIG. 3). At the top of the liner 10 is a well-known relatively rigid fitting 14. At the bottom of the liner 10 is a well-known relatively rigid bottom outlet fitting 16. In the preferred embodiment, the fitting 14 is similar in construction to the bottom outlet fitting 16. Only the bottom outlet fitting 16 will, therefore, be described in detail. It is apparent that a ring or a suitable annular member may be employed in lieu of the fitting 14. Strings 17*a* and 17*b* are fixedly secured at the proximal ends thereof to the outlet fitting 14. In the alternative, a flexible sleeve 17*c* (FIG. 13) may be employed in lieu of the strings 17*a* and 17*b*. The flexible sleeve 17*c* is the preferred embodiment. The strings 17*a* and 17*b* may be made of suitable plastic material and the flexible sleeve 17*c* may be formed integrally with the flexible liner 10 and made of similar flexible material. The sleeve 17*c* may be heat sealed, bonded or otherwise caused to adhere to the flexible liner 10.

Figures 5, 6, 7, 9:
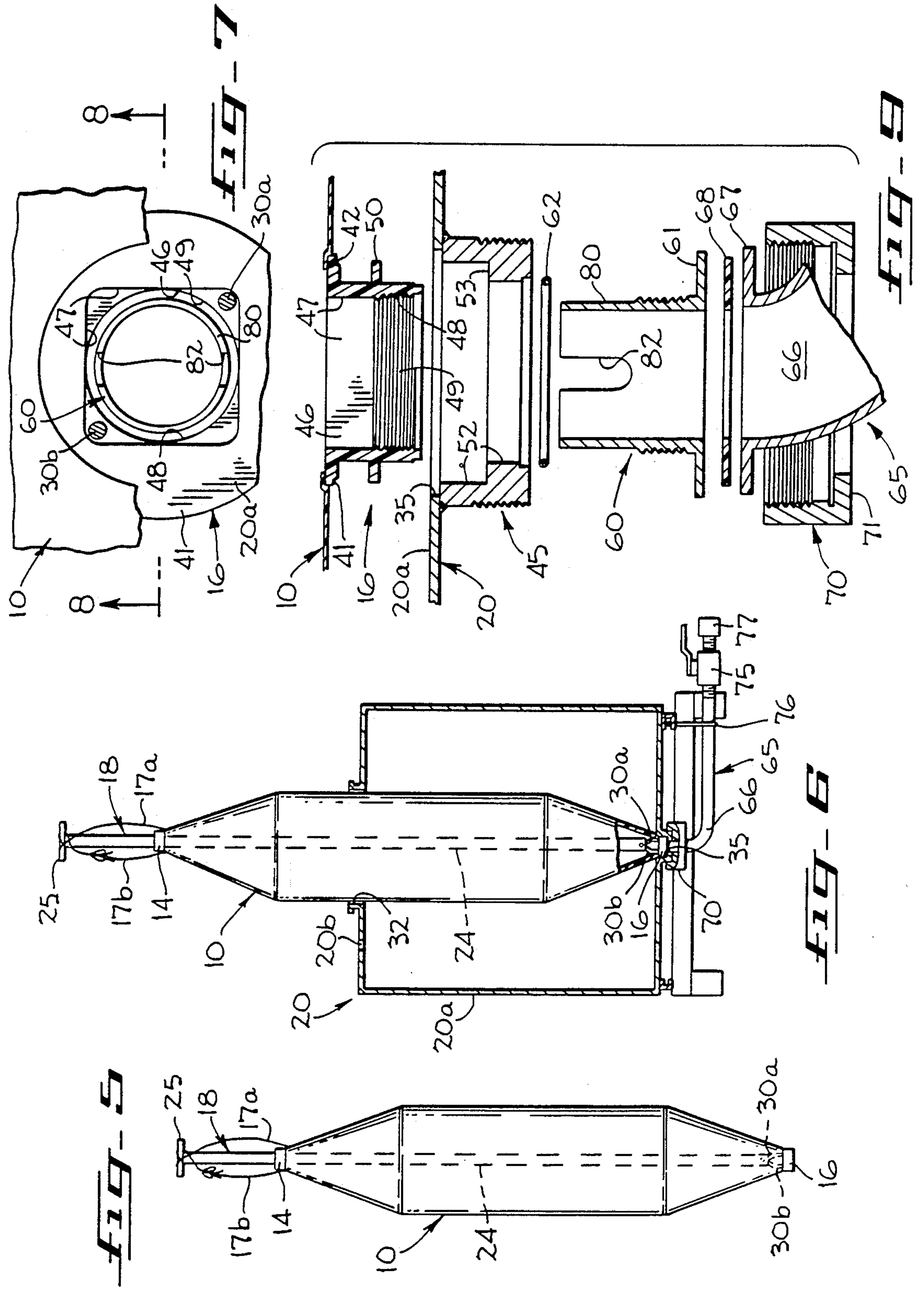
FIG. 5 is a diagrammatic, elevation view of the flexible liner in a deflated state disposed on the installing tool prior to installation in the bulk material container.
FIG. 6 is a vertical sectional view of the bulk material container with the manhole cover removed taken along line 2—2 of FIG. 1 and illustrating a diagrammatic elevation view of the flexible liner in a deflated state disposed on the installing tool and shown partially inserted into the bulk material container.
FIG. 7 is a fragmentary, enlarged plan view of a bottom outlet fitting of the flexible liner shown in FIG. 3 and illustrated gripped by fingers shown in section of the installing tool shown in FIG. 4 and further illustrated with a sleeve and a fragment of the container.
FIG. 9 is an exploded view of the bottom outlet fitting, the discharge fitting, the fastener, the sleeve and conduit shown in FIG. 8.

A tool 18 (FIG. 4) is employed for installing the flexible liner 10 into a shell 20*a* of the container 20 (FIGS. 5 and 6). In the preferred embodiment, the shell 20*a* is made of stainless steel. When the flexible liner 10 is disposed on the tool 18 and is installed in the shell 20*a* by the tool 18, it is in a deflated or in a collapsed state. In FIGS. 3, 5 and 6, the flexible liner 10 is shown extended or stretched for installation on the tool 18. The tool 18 comprises a rigid shaft 24. At the top of the shaft 24 is a suitable handle 25. The strings 17*a* and 17*b* are attached to any convenient place on the handle 25 or elsewhere for attaching the flexible liner 10 to the tool 18. When the sleeve 17*c* is employed, the flexible liner 10 is held manually temporarily for the installation thereof in the shell 20*a*.

At the bottom of the shaft 24 are a plurality of fingers 30*a* and 30*b* for engaging inner upright flat walls 47 of the bottom outlet fitting 16 for imparting downward movement thereto. In the exemplary embodiment, the finger 30*a* is fixed and the finger 30*b* is pivotally attached at the proximal end thereof to the tubular shaft 24 through a pin 32. The proximal end of the finger 30*b* has a loop configuration for receiving the pin 32. The proximal section of each finger 30*a* and 30*b* projects at an angle outwardly from the axis of the tubular shaft 24. The distal section of each finger 30*a* and 30*b*, when the finger 30*b* is fully extended, is disposed axially downwardly. When the finger 30*b* is fully extended, the distal sections of the fingers 30*a* and 30*b* are adapted to engage opposite junctions of the inner upright flat walls 47 of bottom outlet fitting 16 at the lower section of the flexible liner 10 (FIGS. 5–7). When the finger 30*b* is fully retracted, the fingers 30*a* and 30*b* are adapted to move through the fitting 14 of the flexible liner 10 and advance to a position engaging opposite junctions of the walls 47 at the bottom of the lower section of the flexible liner 10. A spring 31 (FIG. 4) continuously urges the finger 30*b* to occupy the fully extended position. When the finger 30*b* advances beyond the fitting 14, it is fully extended under the urgency of the spring 31.

Initially, an operator manually retracts the finger 30*b* against the urgency of the spring 31 and advances the fingers 30*a* and 30*b* through the fitting 14 of the flexible liner 10 while the finger 30*b* is fully retracted. After the operator moves the fingers 30*a* and 30*b* beyond the fitting 14, the finger 30*b* becomes fully extended under the urgency of the spring 31. The operator now advances the tool 18 into the flexible liner 10 until the fingers 30*a* and 30*b* engage the bottom outlet fitting 16 of the flexible liner 10 at opposite junctions of the walls 47 thereof, which are located at the lower section of the flexible liner 10.

The flexible liner 10 disposed on the tool 18 is inserted into the shell 20*a* of the container 20 through a conventional manhole opening 32 (FIG. 6). Normally, the manhole opening 32 is closed by a well-known manhole cover 33 (FIG. 1). At the bottom of the shell 20*a* is a bulk material discharge opening 35. The tool 18 disposes the bottom outlet fitting 16 within the discharge opening 35 (FIG. 6).

The bottom outlet fitting 16 (FIGS. 7-9 and 12) includes a flange 41 that seats on the wall of the shell 20*a* surrounding the opening 35. Below the flange 41, the bottom outlet fitting 16 includes a reduced diameter flange 42 that is disposed above an annular top wall of a discharge fitting 45. The discharge fitting 45 is made of suitable material, such as stainless steel, when the shell of the container 20 is made of stainless steel. The discharge fitting 45 is suitably secured to the bottom wall of the shell 20*a* by suitable means, such as welding or by bolts.

Below the flange 42, the bottom outlet fitting 16 is formed with a cavity 46 having in cross-section a rectangular configuration and surrounded by the upright flat walls 47 (FIGS. 7-9 and 12). In the exemplary embodiment, the walls 47 form a cavity 46 with a square cross-sectional area. At the bottom of the bottom outlet fitting 16 is a cylindrical opening 48 surrounded by a cylindrical internally threaded wall 49. Between the threaded wall 49 and the rectilinear walls 47, the bottom outlet fitting 16 includes a flange 50.

The discharge fitting 45 is formed with a succession of cylindrical reduced diameter openings 52 defining a shoulder 53. The flange 50 of the bottom outlet fitting 16 seats on the shoulder 53 of the discharge fitting 45 in a fluid tight relation. The tool 18 grips the flat, upright walls 47 of the bottom outlet fitting 16 at opposite corners thereof (FIGS. 5-7) to insert the bottom outlet fitting 16 into the discharge fitting 45. When the bottom outlet fitting 16 is fully inserted into the discharge fitting 45, the flange 50 seats on the shoulder 53; the flange 42 is disposed within the opening 35 of the shell 20*a*; and the flange 41 seats on the wall surrounding the opening 35 of the shell 20*a* (FIG. 8).

The flexible liner 10 as installed on the tool 18 (FIG. 5) is disposed in the shell 20*a* (FIG. 6) with the bottom outlet fitting 16 disposed in the discharge fitting 45 in communication therewith. This is carried out by manipulating the top handle 25 of the tool 18. The smooth entry of the bottom outlet fitting 16 into the opening 35 of shell 20*a* is enhanced by providing the reduced diameter opening 52 in the discharge fitting 45 beyond the opening of the bottom outlet fitting 16 surrounded by a threaded wall.

After the bottom outlet fitting 16 is fully inserted into the discharge fitting 45, an externally threaded sleeve 60 (FIGS. 7-9) is attached to the bottom outlet fitting 16 externally of the shell 20*a* by threaded engagement with the threaded cylindrical wall 49 of the bottom outlet fitting 16 surrounding the opening 48. The discharge fitting 45 positions the bottom outlet fitting 16 for receiving the sleeve 60 to establish the locking connection between the bottom outlet fitting 16 and the sleeve 60. The sleeve 60 is made of suitable material, such as stainless steel. The sleeve 60 comprises a flange 61. The threaded sleeve 60 is in threaded engagement with the threaded portion of the bottom discharge fitting 16. The movement of the sleeve 60 within the bottom outlet fitting 16 draws the flange 50 of the bottom outlet fitting 16 against the shoulder 53 of the discharge fitting 45 to form a fluid tight seal. A suitable sealing ring 62 is disposed between the flange 61, the discharge fitting 45 and the outlet fitting 16. The sleeve 60 through its threaded engagement with the bottom outlet fitting 16 and continued movement within the bottom outlet fitting 16 expands the bottom outlet fitting 16 within a cavity of the discharge fitting 45 for compressing the sealing ring 62 into fluid tight, sealing engagement between the flange 61 of the sleeve 60, the discharge fitting 45 and the outlet fitting 16. After the sleeve 60 is attached to the bottom outlet fitting 16, the tool 18 is removed from the flexible liner 10. The tool 18 holds the bottom outlet fitting 16 until a tight fit is attained between the bottom outlet fitting 16, the discharge fitting 45 and the sleeve 60. The bottom outlet fitting 16 is held by the fingers 30*a* and 30*b* of the tool 18 to prevent rotation thereof while the sleeve 60 is tightened for the threaded engagement with the bottom outlet fitting 16.

An outlet assembly 65 (FIGS. 1, 2, 6 and 8-11) is installed exteriorly of the shell 20*a* with the sleeve 60. Toward this end, the outlet assembly 65 comprises a suitable outlet conduit or elbow 66. The elbow 66 includes a flange 67 (FIGS. 8 and 9). In the exemplary embodiment, the flange 67 is welded to the elbow 66. Disposed between the flange 61 of the sleeve 60 and the flange 67 of the elbow 66 is a suitable sealing ring 68. For securing the elbow 66 and the sleeve 60 to the discharge fitting 45, a suitable fastener, such as a lock nut 70, is employed. The lock nut 70 is disposed in threaded engagement with the discharge fitting 45 and is formed with an inwardly directed flange 71 on which is seated the flange 67 of the elbow 66. The flange 61 of the sleeve 60 seats on the flange 67 with the sealing ring 68 therebetween.

When the bottom outlet fitting 16, the discharge fitting 45, the sealing ring 62 and the sleeve 60 are drawn together by the rotation of the sleeve 60 in threaded engagement with the wall surrounding the opening 48 of the bottom outlet fitting 16, the flange 50 of the bottom outlet fitting 16 is drawn against the shoulder 53 of the discharge fitting 45 to provide a seal. Additionally, a seal is formed when the sleeve 60 has completed its movement in threaded engagement with the outlet fitting 16 so as to expandingly urge the outlet fitting 16 into the cavity of the discharge fitting 45 for urging the sealing ring 62 to form a fluid tight seal between the outlet fitting 16, the discharge fitting 45 and the flange 61 of the sleeve 60. Since the bottom outlet fitting 16 is made of yieldable material, such as polyvinyl chloride or polyethylene, the compliant and plastic deformation of the flange 50 forms an effective compression seal at the interface of the flange 50 with the shoulder 53 of discharge fitting 45, and at a portion of the outlet fitting 16 urged into engagement with the sealing ring 62.

The lock nut 70, when tightened, draws the flange 67 of the elbow 66 toward the flange 61 of the sleeve 60 to provide a seal therebetween through the sealing ring 68. Thus, there is a fluid tight relation between the discharge fitting 45, the sleeve 60 and the elbow 66.

Figure 14:
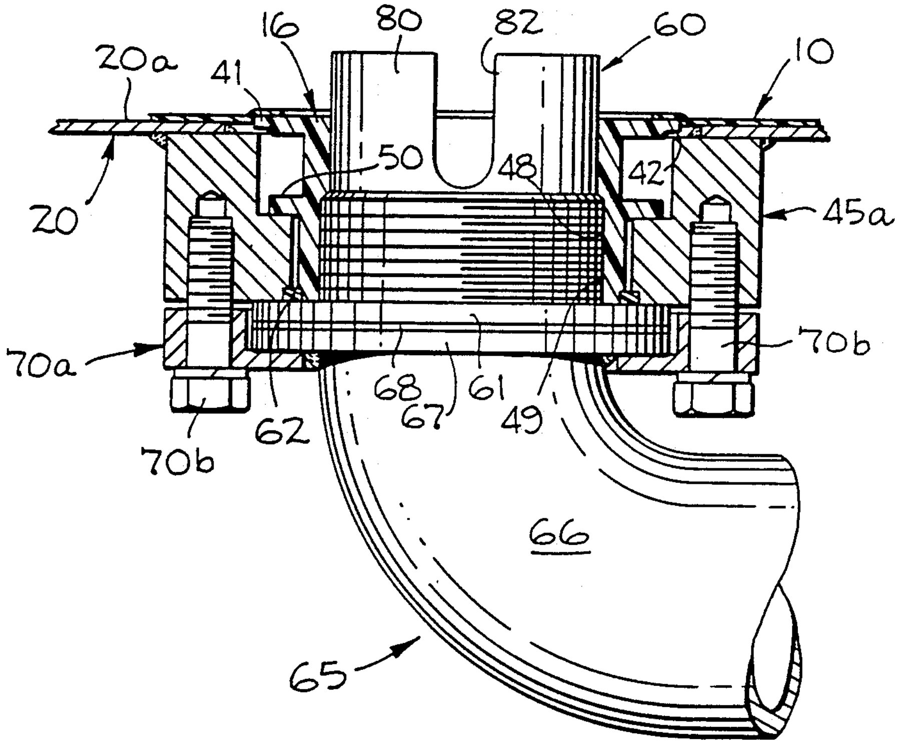
FIG. 14 is a diagrammatic elevation view of a modified fastener for securing the conduit of an outlet assembly to the discharge fitting.

In lieu of the lock nut 70, it is within the contemplation of the present invention to employ other suitable fasteners, such as screw attaching fastener 70*a* (FIG. 14). A plurality of screws 70*b* are secured in threaded engagement with a discharge fitting 45*a*. A tightening of the screws 70*b* into the discharge fitting 45*a* draws the flange 67 of the elbow 66 toward the flange 61 of the sleeve 60 to provide a seal therebetween through the sealing ring 68 as well as the other sealing effects achieved through the lock nut 70.

The outlet assembly 65 (FIGS. 1, 2, 6, 8, 10 and 11) includes a suitable valve 75, such as a conventional ball valve, connected to the elbow 66. A U-bolt clamp 76 supports the outlet assembly 65 from the shell 20*a*. Bulk material contained in the flexible liner 10 is removed from or drawn out of the flexible liner 10 through the outlet assembly 65 (FIGS. 2 and 11) by suitable means, not shown, such as a vacuum pump. The vacuum pump is connected to a suitable fixture 77 of the outlet assembly 65. The flexible liner 10 is inflated before being filled with bulk material (FIG. 10). For this purpose, air under pressure is conducted through the outlet assembly 65 to inflate the installed flexible liner 10 while the fixture 14 is closed. A source of air under pressure, not shown, is connected to the fitting 77 for supplying air under pressure to inflate the flexible liner 10.

As previously described, the flexible liner 10 is made of suitable material, such as polyvinyl chloride or polyethylene. The bottom outlet fitting 16 is similarly made of polyethylene or polyvinyl chloride, but in a relatively more rigid state. The flexible liner 10 excepting for the fitting 14 and the bottom outlet fitting 16 is flexible, collapsible and inflatable. Polyethylene and polyvinyl chloride are materials that lend themselves to heat sealing and tend to flow upon the application of pressure. The section of the bottom wall of the flexible liner 10 which has a suitable opening to receive the bottom outlet fitting 16 of the flexible liner 10 is heat sealed, bonded, or otherwise caused to adhere in a conventional manner to the top surface of the flange 41 of the bottom outlet fitting 16. The fitting 14 is similarly caused to adhere to the flexible liner 10 but at the top wall thereof and, of course, is received by an opening in the top wall f the flexible liner 10.

Figure 13:
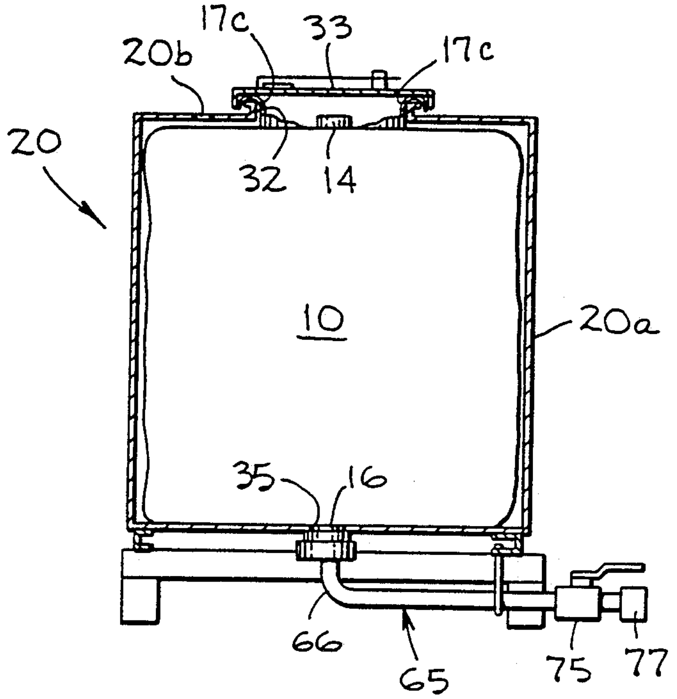
FIG. 13 is a diagrammatic elevation view of a modified flexible liner employing a flexible sleeve in lieu of strings for attachment to a manhole cover illustrated with a fragmentary showing of a bulk material container with a manhole cover.

The flexible liner 10 may be employed as a fixed liner (FIGS. 2, 10 and 13). At least one atmospheric vent 20*b* is formed in the top wall of the shell 20*a*, when the flexible liner 10 is used as a fixed liner to provide communication between atmosphere and the space located within the shell 20*a* between the cylindrical wall of the shell 20*a* and the outer wall of the flexible liner 10. Toward this end, the strings 17*a* and 17*b* of the flexible liner 10 are clamped or pressed between the manhole cover 33 and a flange along the neck of the shell 20*a* surrounding the manhole 32 of the shell 20*a*. In the alternative, the sleeve 17*c* of the flexible liner 10 is clamped or pressed between the manhole cover 33 and the flange along the neck of the shell 20 *a* surrounding the manhole 32 of the shell 20*a*, which is the preferred embodiment. The sleeve 17*c* when so installed maintains a seal between the manhole cover 33 and the neck of the shell 20*a*. The fitting 14, when free of a plug therein, is capable of breathing or venting to atmosphere through a pressure-vacuum valve generally installed in conventional manhole covers. In this manner, the top of the flexible liner 10 is releasably secured to the top of the shell 20*a*. The flexible liner 10 is inserted into the opening at the bottom wall of the shell 20*a* in the manner heretofore described in connection with the bottom outlet fitting 16. No plug is inserted into the fitting 14 when the flexible liner 10 is employed as a fixed liner during the removal of bulk material therefrom.

The flexible liner 10 may be optionally employed as a floating liner (FIG. 11). The flexible liner 10, when employed as a floating liner, is inserted into the bottom wall of the shell 20*a* in the manner heretofore described. The top of the flexible liner 10 is not secured to the shell 20*a* and is free to move downwardly within the shell 20*a* as bulk material is removed from the flexible liner 10. Hence, neither the strings 17*a* and 17*b*, nor the sleeve 17*c* need be present or used.

A cylindrical section 80 of the sleeve 60 (FIGS. 8 and 9) extends axially in an upward direction beyond the flange 41 of the bottom outlet fitting 16. At least one access opening or slot 82 is formed in the cylindrical wall of the section 80 above and below the flange 41. In the event the flexible liner 10 fully collapses, bulk material not discharged through the outlet assembly 65 or trapped within the flexible liner 10 will flow through the access opening or slot 82 into the sleeve 60 for discharging remaining bulk material through the outlet assembly 65.

In the use of the bulk material container 20 embodying the present invention, the manhole cover 33 is removed to expose the manhole 32. The flexible liner 10 is disposed on the tool 18 (FIG. 5). Toward this end, the tool 18 is inserted into the deflated flexible liner 10 by inserting the fingers 30*a* and 30*b* through the fitting 14 of the flexible liner 10 while the finger 30*b* is retracted. After the fingers 30*a* and 30*b* advance beyond the fitting 14, the fingers 30*a* and 30*b* are extended and are inserted into opposing corners of the wall 47 of the bottom outlet fitting 16. Now, the tool 18 and the flexible liner 10 are inserted into the shell 20*a* through the manhole 32 (FIG. 6). The tool 18 is used to insert the bottom outlet fitting 16 through the opening 35 at the bottom of the shell 20*a* and into the discharge fitting 45. The tool 18 holds the bottom outlet fitting in the discharge fitting 45 while the sleeve 60 is tightened on the outlet discharge fitting 16.

The sleeve 60 is now attached exteriorly of the shell 20*a* to the bottom outlet fitting 16 through threaded engagement (FIG. 8). Once the sleeve 60 is attached in this manner to the bottom outlet fitting 16, the flexible liner 10 is completely installed in the shell 20*a* and the tool 18 is removed from the flexible liner 10. The elbow 66 is positioned with the flange 67 below the flange 61 of the sleeve 60 and with the sealing ring 68 therebetween. The lock nut 70 is threaded to the discharge fitting 45 and rotated until there is a proper fit therebetween. Now the valve 75 of the outlet assembly 65 is installed along with the remaining parts of the outlet assembly 65.

If the flexible liner 10 is to be used as a floating liner (FIG. 11), a plug, not shown, is inserted into the fitting 14 as a pressure relief plug. The flexible liner 10 is permitted to fall into the shell 20*a*. The flexible liner 10 is now inflated by air under pressure passing through the elbow 66, sleeve 60, the discharge fitting 45 and the bottom inlet fitting 16. Bulk material is supplied to the flexible liner 10 through the elbow 66, sleeve 60, the discharge fitting 45 and the bottom inlet fitting 16 while the plug in the fitting 14 is loosened to vent the air in the inflated flexible liner 10. After the flexible liner 10 is filled with bulk material and the air is vented therethrough, the plug is tightened in the fitting 14 to form a seal therewith. Now, bulk material is drawn from the flexible liner 10 through the outlet assembly 65 (FIG. 11). As bulk material is drawn from the flexible liner 10, the flexible liner 10 will collapse and air will enter the shell 20*a* above the flexible liner 10 through a vacuum relief valve 85 in the manhole cover 33.

If the flexible liner 10 is to be used as a fixed liner (FIGS. 2 and 10), the foregoing steps are repeated for installing the bottom outlet fitting into the discharge fitting 45, for attaching the sleeve 60 to the bottom outlet fitting 16, for attaching the elbow 66 to the discharge fitting 45 through the lock nut 70 and for completing the installation of the outlet assembly 65.

A plug, not shown, is temporarily inserted into the fitting 14. The vent **20*b* in the top wall of the shell 20*a* vents the space between the shell 20*a* and the flexible liner 10. The flexible liner 10 is now inflated by air under pressure through the elbow 66, the sleeve 60, the discharge fitting and the bottom inlet fitting 16. Now the fitting 14 of the flexible liner 10 is urged upwardly by air under pressure and the strings 17*a* and 17*b* are clamped, or the sleeve 17*c* is clamped, between the neck of the shell 20*a* and manhole cover 33 (FIGS. 2 and 10). The plug is removed from the fitting 14. Bulk material is supplied to the flexible liner 10 through the elbow 66, sleeve 60, the discharge fitting 45 and the bottom inlet fitting 16 while the fitting 14 is open for air to be vented from the flexible liner 10. As the flexible liner 10 expands from the storing of bulk material, air between the shell 20*a* and the flexible liner 10 is vented to atmosphere through the vent 20*b*. If desired, the vent 20*b* can be closed by a suitable plug after the flexible liner 10 is completely filled with bulk material for the drawing off therefrom bulk material. Bulk material is now ready to be drawn from the flexible liner 10 through the outlet assembly 65. The flexible liner 10 is held in place by the action of the manhole cover 33 as above-described as the bulk material is drawn from the flexible liner 10. As bulk material is drawn from the flexible liner 10, air enters the flexible liner 10 through a vacuum relief valve 85 in the manhole cover 33**.

In FIG. 2, the flexible liner 10 will collapse as bulk material is removed therefrom to the degree of air venting into the space between the shell **20*a* and the flexible liner 10. In FIG. 10, the liner 10 does not collapse when bulk material is removed therefrom. An open fitting 14 and a manhole cover 33 with the pressure and vacuum valve 85 will maintain the flexible liner 10 against the wall of the shell 20*a***.

Figure 15:
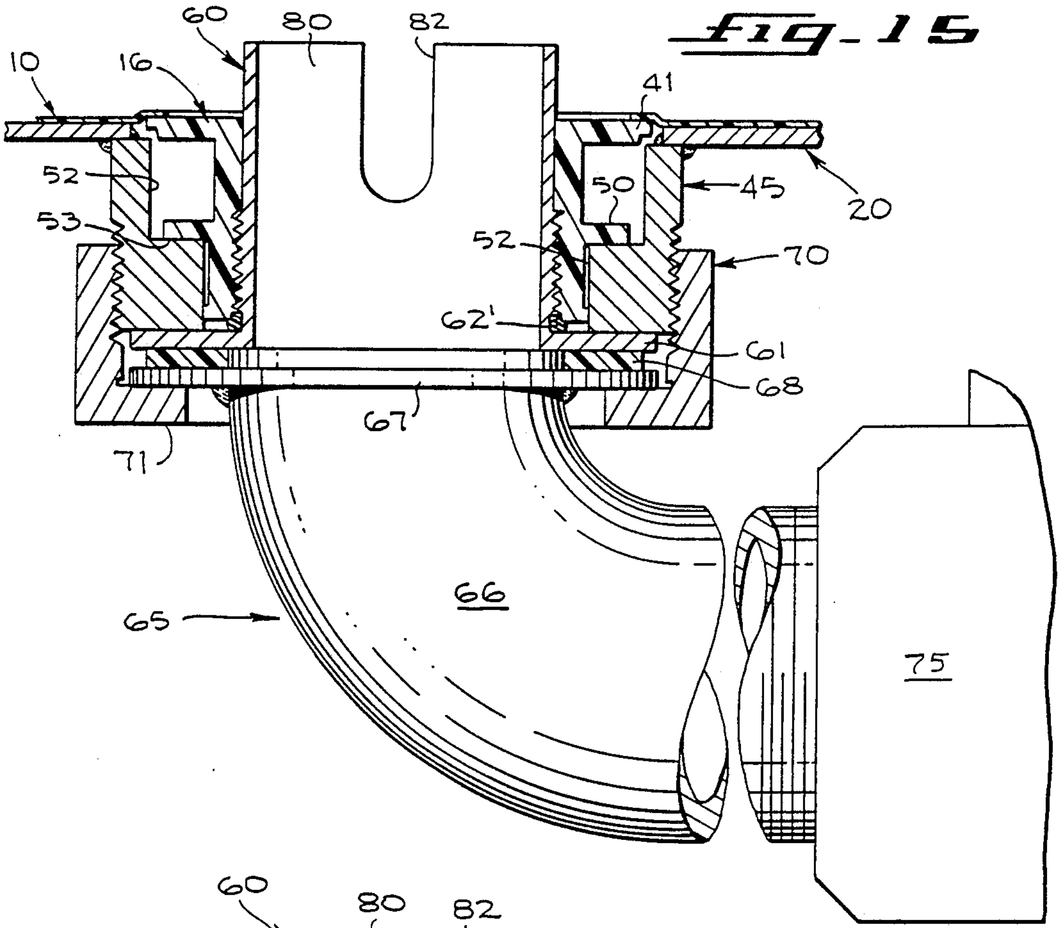
FIG. 15 is a view similar to FIG. 8 with a modified O-ring seal between the bottom outlet fitting and the sleeve.

Illustrated in FIG. 15 is a modification of the sealing arrangement between the bottom outlet fitting 16 and the sleeve 60 to the extent that the sealing ring 62 has been replaced by an O-ring 62'. The O-ring 62' is now disposed in the space above the flange 61 of the sleeve 60 and below the threaded engagement between the bottom outlet fitting 16 and the sleeve 60. The O-ring 62' engages the bottom outlet fitting 16 and sleeve 60 below the threaded engagement between the bottom outlet fitting 16 and the sleeve 60. The O-ring 62' also engages the flange 61 of the sleeve 60. When the sleeve 60 moves from the threaded engagement with the bottom outlet fitting 16 into the bottom outlet fitting 16, the flange 61 moves toward the bottom outlet fitting 16 to compress the O-ring 62' into sealing engagement between the sleeve 60 and the bottom outlet fitting 16.

Figure 16:
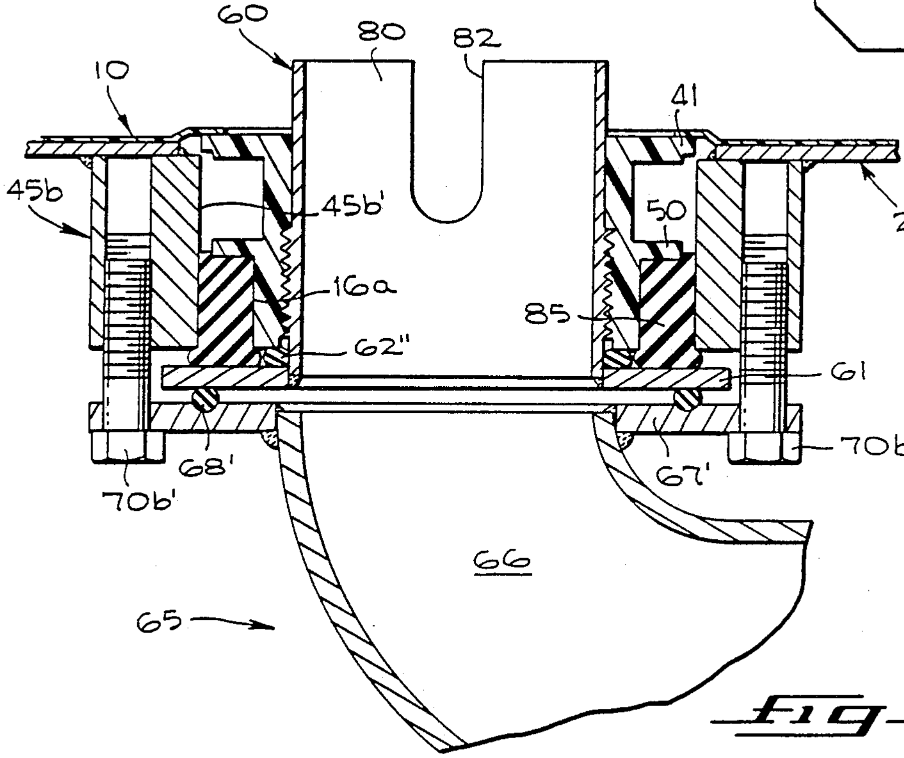
FIG. 16 is a view similar to FIG. 14 modified to provide a yieldable spacer between the bottom outlet fitting and the discharge fitting; an O-ring seal between the bottom outlet fitting and the sleeve; and an O-ring between the sleeve and the conduit of the outlet assembly.

Illustrated in FIG. 16 is a modification of the discharge fitting **45*a*, the seal ring 62 and the seal ring 68 shown in FIG. 14. A discharge fitting 45*b* is similar to the discharge fitting 45*a*, except the inner cylindrical wall 45*b*' is spaced radially from the outer cylindrical walls of the bottom outlet fitting 16. Disposed above the flange 61 of the sleeve 60 and below the flange 50 of the bottom outlet fitting 16 is a yieldable annular spacer 85 made of suitable plastic material. The spacer 85 engages the inner cylindrical wall 45*b*' of the discharge fitting 45*b* and the outer cylindrical wall 16*a* of the bottom outlet fitting 16. The spacer 85 also engages the flange 50 of the bottom outlet fitting 16 and the flange 61 of the sleeve 60. When the sleeve 60 moves from the threaded engagement with the bottom outlet fitting 16 into the bottom outlet fitting 16, the flange 61 moves toward the bottom outlet fitting 16 to compress the spacer 85 into sealing engagement with the flange 50 of the bottom outlet fitting 16, the inner cylindrical wall 45*b*' of the discharge fitting 45*b*, the flange 61 of the sleeve 60 and the outer cylindrical wall 16*a* of the bottom outlet fitting 16**.

An O-ring 62" (FIG. 16) is disposed in the space above the flange 61 of the sleeve 60 and below the threaded engagement between the bottom outlet fitting 16 and the sleeve 60. The O-ring 62 engages the bottom outlet fitting 16 and the sleeve 60 below the threaded engagement between the bottom outlet fitting 16 and the sleeve 60. The O-ring 62" also engages the flange 61 of the sleeve 60. When the sleeve 60 moves from the threaded engagement with the bottom outlet fitting 16 into the bottom outlet fitting 16, the flange 61 moves toward the bottom outlet fitting 16 to compress the O-ring 62" into sealing engagement with the sleeve 60 and the bottom outlet fitting 16.

An O-ring 68' (FIG. 16) is disposed between a flange 67' of the conduit 66 and the flange 61 of the sleeve 60. In the exemplary embodiment, the flange 67' is welded to the elbow 66. Suitable threaded fasteners **70*b*' are received by suitable threaded bores formed in the flange 67' and by threaded bores formed in the discharge fitting 45*b*. By moving the threaded fasteners into the threaded bores in the discharge fitting 45*b*, the O-ring 68' is compressed to form a fluid tight seal between the flange 67' of the conduit 66 and the flange 61 of the sleeve 60**.

What is claimed is:

1. A method of installing a flexible liner with a bottom outlet fitting, an open upper end and an open lower end in a shell of a bulk material container having a discharge outlet fitting at the bottom thereof, said method comprising the steps of:

(a) disposing the flexible liner on an installing tool;

(b) moving the installing tool, with the flexible liner disposed thereon, into the discharge outlet fitting at the bottom of said shell;

(c) securing the bottom outlet fitting of said flexible liner to the discharge outlet fitting at the bottom of said shell; and (d) removing the installing tool from said shell while said flexible liner and said bottom outlet fitting remain in the installed positions.

2. A method of installing a flexible liner into a shell of a bulk material container as claimed in claim 1 wherein the step of disposing the flexible liner on the installing tool includes inserting the installing tool into the open upper end of the flexible liner, and moving the installing tool into the flexible liner until the installing tool engages the outlet fitting at the open lower end of the flexible liner.

3. A method of installing a flexible liner into a shell of a bulk material container as claimed in claim 1 wherein the tool has fingers at the distal end thereof and wherein the step of disposing the flexible liner on the installing tool includes inserting the fingers of the installing tool into the open upper end of the flexible liner, and moving the installing tool into the flexible liner until the fingers of the installing tool engage the outlet fitting at the open lower end of the flexible liner.

* * * * *